United States Patent [19]

Wolf et al.

[11] Patent Number: 4,486,455
[45] Date of Patent: Dec. 4, 1984

[54] WATER-SOLUBLE SWEETENING TABLETS

[75] Inventors: Erich Wolf, Overath; Rolf Deininger, Cologne, both of Fed. Rep. of Germany

[73] Assignee: Chimicasa GmbH, Chur, Switzerland

[21] Appl. No.: 431,071

[22] Filed: Sep. 30, 1982

[30] Foreign Application Priority Data

Aug. 31, 1982 [EP] European Pat. Off. ........ 82108001.7

[51] Int. Cl.$^3$ .............................................. A23L 1/236
[52] U.S. Cl. .................................... 426/548; 426/285; 426/454
[58] Field of Search ................. 426/548, 271, 285, 454

[56] References Cited

U.S. PATENT DOCUMENTS

| | | | |
|---|---|---|---|
| 4,009,291 | 2/1977 | Mitchell et al. | 426/548 |
| 4,031,259 | 6/1977 | Lugay et al. | 426/548 |
| 4,230,687 | 10/1980 | Sair et al. | 426/548 |
| 4,292,336 | 9/1981 | Latymer | 426/548 |
| 4,384,004 | 5/1983 | Cea et al. | 426/548 |

FOREIGN PATENT DOCUMENTS 0063068  4/1982  Japan .

OTHER PUBLICATIONS

Hawley, Gessner G., *The Condensed Chemical Dictionary*, 8th ed.; ©1971, Van Nostrand Reinhold Co., p. 824.
Rose, A. et al. eds., *The Condensed Chemical Dictionary*, 7th ed., ©1966, p. 454.

*Primary Examiner*—Raymond Jones
*Assistant Examiner*—Elizabeth C. Weimar
*Attorney, Agent, or Firm*—Wenderoth, Lind & Ponack

[57] ABSTRACT

A sweetening tablet containing 100 parts by weight of APM (L-aspartyl-L-phenylalanine methylester) with a particle size of from 0.01 to 0.4 mm, 150 to 400 parts of glycine, 10 to 40 parts solubility accelerator, and up to 4 parts auxiliary tabletting agent, in each case based on dry weight.

5 Claims, No Drawings

WATER-SOLUBLE SWEETENING TABLETS

This invention relates to a water-soluble sweetening tablet stabilized by compression, containing finely ground APM (L-aspartyl-L-phenylalanine methylester) as a sweetening agent, a multiple of the APM weight of a water-soluble filler, a fraction of the APM weight of a solubility accelerator, and a fraction of the APM weight of an auxiliary tabletting agent.

The filler functions as a separating agent by preventing the individual APM granules, during the tabletting process, from clumping together. The filler dissolves in water and the APM granules are dispersed in the solution. This process is promoted and accelerated by the solubility accelerator.

Lactose is used as a filler in sweetening tablets of the prior art. However, it is desirable—among other things, because such sweetening tablets are also enjoyed by diabetics—to avoid digestible carbohydrates, lactose being one of them.

This is accomplished, in accordance with the present invention, by a composition containing, on a dry weight basis, 100 parts by weight APM, 150 to 400, preferably 310 to 350, parts glycine as filler, 10 to 40, preferably 12 to 16, parts solubility accelerator, and 0 to 4.0, preferably 0.8 to 1.2, parts auxiliary tabletting agent, wherein the APM has a granular size of 0.01 to 0.4 mm and, preferably, the solubility accelerator is a cross-linked jellifier that swells in water.

The invention takes advantage of the fact that glycine, as an ingredient of many foodstuffs, is physiologically safe and, as an amino acid, is compatible with the constituents of the APM.

The solubility accelerator, as a swelling agent, disperses the tablet upon addition of water. Recommended solubility accelerators include cross-linked NaCMC (sodium carboxymethylcellulose), also known under the tradename Ac-Di-Sol, and/or cross-linked PVP (polyvinyl pyrrolidone), also known under the tradename PLASTONE, and/or a modified starch whose modification enhances its swelling characteristics. An example of the modified starch which, preferably, is used as the solubility accelerator, is NaCMS (sodium starch glycolate). This modified starch is known under the tradename PRIMOJEL.

Preferably, the auxiliary tabletting agent serves as a lubricant during the molding of the tablets. Recommended tabletting agents include GPS (glycerin palmitostearate), also known under the tradename PRECIROL, and L-leucine. However, if suitable modern tabletting machines are used, the auxiliary tabletting agent can possibly be dispensed with completely.

The following examples illustrate the invention, without being limited thereto.

EXAMPLE 1

The following components are used:
Sweetening agent, 180 g: 22.50% APM with a granular size of from 0.05 to 0.1 mm;
Filler, 588 g: 73.50% glycine;
Solubility accelerator, 30 g: 3.75% cross-linked NaCMC;
Auxiliary tabletting agent, 2 g: 0.25% GPS;
Distilled water, 250 ml.
The percentages are based on dry weight.
Tabletting: A mixture is prepared from the APM, the glycine and the water. This mixture is screened through a screen with a mesh size of 1.6 mm and dried in a layer thickness of 1 cm at 70° C. for 5 hours until a residual moisture content of 3% is obtained. The dry substance thus obtained is screened through a screen with a mesh size of 0.3 mm and mixed with the NaCMC and the GPS. The flowable powder mixture thus obtained is compressed into tablets.

Properties of the Finished Tablets

Weight of each tablet: 80 mg;
Size of each tablet: round, diameter 5 mm;
Dissolution time in 18° C. water: within 60 seconds;
Color of tablets: white;
Stability of tablets when stored for 90 days at 35° C. and 80% relative humidity: no change.

Each tablet contains 18 mg of sweetening agent, 59 mg of filler, 3 mg of solubility accelerator and 0.2 mg of auxiliary tabletting agent.

The following examples differ from Example 1 only as indicated in the table below:

TABLE

| Charge: | Example 2 | Example 3 |
|---|---|---|
| Quantity of sweetening agent | 100 g | 100 g |
| Particle size of sweetening agent | 0.1 to 0.4 mm | 0.01 to 0.05 mm |
| Quantity of filler | 150 g | 400 g |
| Solubility accelerator | NaCMS | PVP |
| Quantity of accelerator | 10 g | 40 g |
| Aux. tabletting agent | L-leucine | — |
| Quantity of tabletting agent | 4.0 g | 0 |
| Quantity of water | 80 ml | 180 ml |
| Properties of each finished tablet: | | |
| Weight | 50 mg | 100 mg |
| Size | 4 mm ⌀ | 6 mm ⌀ |
| Dissolution time* | within 120 sec. | within 60 sec. |
| Stability* | As Example 1 | As Example 1 |
| Color | As Example 1 | As Example 1 |
| Quantity of sweetening agent | 19 mg | 19 mg |
| Quantity of filler | 28 mg | 74 mg |
| Quantity of accelerator | 2 mg | 7 mg |
| Quantity of tabletting agent | 1 mg | 0 |

*each under the conditions stated in Example 1

If too much filler is charged, an unnecessary surplus of filler will result. The amount of filler in Example 3 is just within the limits.

If too little filler is charged, there will not be enough filler to separate the APM grains from one another, which is desirable for quick solubility. The quantity of filler in Example 2 is just enough to achieve sufficient solubility.

What is claimed is:
1. A compressed water-soluble sweetening tablet containing, on a dry weight basis:
   100 parts of L-aspartyl-L-phenylalanine methylester as a sweetening agent, having a granular size of 0.01 to 0.4 mm,
   150 to 400 parts of glycine as a filler,
   10 to 40 parts of a water-swellable jellifier selected from the group consisting of cross-linked sodium carboxymethylcellulose and cross-linked polyvinyl pyrrolidone as a solubility accelerator, and
   0 to 4 parts of an auxiliary tabletting agent.
2. A tablet according to claim 1, wherein the solubility accelerator is cross-linked sodium carboxymethylcellulose.

3. A tablet according to claim 1, wherein the solubility accelerator is cross-linked polyvinyl pyrrolidone.

4. A tablet according to any one of claims 1, 2, and 3 containing, on a dry weight basis:
   100 parts of the L-aspartyl-L-phenylalanine methylester,
   310 to 350 parts of the glycine,
   12 to 16 parts of the solubility accelerator, and
   0.8 to 1.2 parts of the auxiliary tabletting agent.

5. A tablet according to any one of claims 1, 2 and 3 containing, on a dry weight basis:
   22.50% of the L-aspartyl-L-phenylalanine methylester,
   73.50% of the glycine,
   3.75% of cross-linked sodium carboxymethylcellulose, and
   0.25% of glycerin palmitostearate.

* * * * *